US009970215B2

(12) United States Patent
Risi

(10) Patent No.: US 9,970,215 B2
(45) Date of Patent: May 15, 2018

(54) ACTUATING ASSEMBLY FOR A LATCHING SYSTEM

(71) Applicant: Bryan Michael Risi, Gauteng (ZA)

(72) Inventor: Bryan Michael Risi, Gauteng (ZA)

( * ) Notice: Subject to any disclaimer, the term of this patent is extended or adjusted under 35 U.S.C. 154(b) by 0 days. days.

(21) Appl. No.: 15/564,102

(22) PCT Filed: Apr. 20, 2016

(86) PCT No.: PCT/ZA2016/000008
§ 371 (c)(1),
(2) Date: Oct. 3, 2017

(87) PCT Pub. No.: WO2016/176694
PCT Pub. Date: Nov. 3, 2016

(65) Prior Publication Data

US 2018/0080257 A1 Mar. 22, 2018

(30) Foreign Application Priority Data

Apr. 30, 2015 (ZA) ................................ 2015/02967

(51) Int. Cl.
*G05B 19/00* (2006.01)
*E05B 47/06* (2006.01)
(Continued)

(52) U.S. Cl.
CPC ...... *E05B 47/0696* (2013.01); *E05B 47/0012* (2013.01); *E05B 47/0611* (2013.01);
(Continued)

(58) Field of Classification Search
USPC ................................ 70/275, 276, 277, 278.7
See application file for complete search history.

(56) References Cited

U.S. PATENT DOCUMENTS 3,785,188 A 1/1974 Drathschmidt
4,580,424 A 4/1986 Evans
(Continued)

FOREIGN PATENT DOCUMENTS

CH 446108 10/1967
DE 433321 9/1926
(Continued)

OTHER PUBLICATIONS

International Search Report in international patent application serial No. PCT/ZA2016/000008 dated Aug. 18, 2016.

*Primary Examiner* — Curtis King
(74) *Attorney, Agent, or Firm* — Haugen Law Firm PLLP

(57) ABSTRACT

An actuating assembly of a locking system (200) to operate a displaceable component of a latching system (210), includes: (i) a first member (24) which is connected or connectable to the displaceable component of the latching system (210); (ii) a second member (26), the first and second members (24, 26) being disconnectably connectable to each other, with the first and second members (24, 26) being in an inoperative configuration when they are disconnected from each other such that the second member (26) is displaceable independently of the first member (24), and the first and second members (24, 26) being in an operative configuration when they are connected to each other such that displacement of the second member (26) causes the first member (24) to be displaced; (iii) a first actuating sub-assembly (46) including a first key receiver (230) for receiving a non-mechanical first key in the form of a predetermined electromagnetic signal transmitted via a cellular telecommunications network from the communications facility (224) of a monitoring facility (227) to an electronic controller (228); (iv) a second actuating sub-assembly (52) which is operable by a second key (226), the second actuating sub-assembly (52) being operably connected to the second member (26)
(Continued)

and being configured, when actuated by the second key (226), to cause the second member (26) to be displaced, thereby to cause the first member (24) to be displaced when the first and second members (24, 26) are in their operative configuration; and (v) a timer for determining the time from receipt of a first key by the first actuating sub-assembly (46), wherein the first actuating subassembly (46) is configured, upon: (i) receipt of the first key, to cause the first and second members (24, 26) to assume their operative configuration; and (ii) elapse of a preset time stored in a storage means (236) measured by the timer from receipt of a first key by the first actuating sub-assembly (46), to cause the first and second members (24, 26) to assume their inoperative configuration.

26 Claims, 15 Drawing Sheets

(51) Int. Cl.
*E05B 47/00* (2006.01)
*G07C 9/00* (2006.01)

(52) U.S. Cl.
CPC .. *G07C 9/00309* (2013.01); *E05B 2047/0016* (2013.01); *E05B 2047/0026* (2013.01); *G07C 2009/00825* (2013.01)

(56) References Cited

U.S. PATENT DOCUMENTS

| | | | | |
|---|---|---|---|---|
| 4,656,852 | A | 4/1987 | Deschamps | |
| 4,850,623 | A | 7/1989 | Franklin et al. | |
| 5,219,386 | A | 6/1993 | Kletzmaier et al. | |
| 5,477,213 | A * | 12/1995 | Atarashi | G07C 9/00817 235/382.5 |
| 5,592,838 | A * | 1/1997 | Clark | E05B 37/00 292/251.5 |
| 5,609,051 | A * | 3/1997 | Donaldson | E05B 47/0673 340/5.54 |
| 5,701,828 | A | 12/1997 | Benore et al. | |
| 5,715,716 | A * | 2/1998 | Miller | E05B 17/2084 292/144 |
| 5,881,589 | A * | 3/1999 | Clark | E05B 47/0012 70/278.7 |
| 5,884,515 | A * | 3/1999 | Milman | E05B 47/068 192/84.21 |
| 6,046,558 | A * | 4/2000 | Larson | G07C 1/32 318/280 |
| 6,384,711 | B1 * | 5/2002 | Cregger | G07C 9/00103 340/5.65 |
| 7,516,633 | B1 * | 4/2009 | Chang | E05B 13/101 292/251.5 |
| 7,728,711 | B2 * | 6/2010 | Shoenfeld | E05B 47/0012 340/5.1 |
| 7,891,222 | B2 * | 2/2011 | Ratkus | E05B 47/0012 70/278.7 |
| 8,146,394 | B2 * | 4/2012 | Krueger | E05B 5/00 292/DIG. 31 |
| 8,365,561 | B2 * | 2/2013 | Chang | E05B 47/02 292/142 |
| 8,397,546 | B2 * | 3/2013 | Varney | E05B 47/004 292/194 |
| 8,677,792 | B2 * | 3/2014 | Wheeler | E05B 17/0058 70/218 |
| 8,922,333 | B1 * | 12/2014 | Kirkjan | G07C 9/00309 235/376 |
| 2002/0145292 | A1 * | 10/2002 | Furner | E05B 47/0603 292/341.16 |
| 2005/0050928 | A1 * | 3/2005 | Frolov | E05B 47/068 70/278.3 |
| 2007/0209413 | A1 * | 9/2007 | Dobbs | E05B 13/005 70/279.1 |
| 2007/0222229 | A1 * | 9/2007 | Jasper | E05B 47/0607 292/33 |
| 2008/0314100 | A1 * | 12/2008 | Min | E05B 47/0012 70/278.1 |
| 2009/0049878 | A1 | 2/2009 | Amir | |
| 2009/0085717 | A1 * | 4/2009 | Kirkjan | G07C 9/00309 340/5.2 |
| 2009/0211320 | A1 * | 8/2009 | Wu | E05B 47/0012 70/277 |
| 2009/0229328 | A1 * | 9/2009 | Wu | E05B 47/0012 70/277 |
| 2009/0255303 | A1 * | 10/2009 | Stobbe | E05B 1/0092 70/276 |
| 2010/0000274 | A1 * | 1/2010 | Viso Cabrera | E05B 17/22 70/278.7 |
| 2011/0067464 | A1 * | 3/2011 | Chiou | E05B 47/0012 70/278.7 |
| 2011/0185554 | A1 * | 8/2011 | Huang | B23P 11/00 29/428 |
| 2011/0316683 | A1 * | 12/2011 | Louis | E05B 81/06 340/426.28 |
| 2012/0222461 | A1 * | 9/2012 | Sendín Martín | G07C 9/00309 70/277 |
| 2013/0139561 | A1 * | 6/2013 | Parto | E05B 47/0611 70/278.7 |
| 2013/0255335 | A1 * | 10/2013 | Jonely | E05B 47/0001 70/277 |
| 2014/0047878 | A1 * | 2/2014 | Zheng | E05B 47/0012 70/275 |
| 2014/0197920 | A1 | 7/2014 | Bates | |
| 2014/0260452 | A1 * | 9/2014 | Chen | G07C 9/00174 70/279.1 |
| 2015/0107316 | A1 * | 4/2015 | Kirkjan | G07C 9/00182 70/275 |

FOREIGN PATENT DOCUMENTS

| | | |
|---|---|---|
| DE | 503560 | 7/1930 |
| DE | 4441834 | 5/1996 |
| EP | 0168884 | 1/1986 |
| EP | 0231532 | 8/1987 |
| EP | 2562333 | 2/2013 |
| EP | 2666937 | 11/2013 |
| EP | 2677506 | 12/2013 |
| GB | 2206638 | 1/1989 |
| GB | 2313148 | 11/1997 |
| JP | 2008100014 | 5/2008 |
| KR | 20100075104 | 7/2010 |
| WO | 9918311 | 4/1999 |

* cited by examiner

ACTUATING ASSEMBLY FOR A LATCHING SYSTEM

BACKGROUND

The present invention relates to an actuating assembly, in particular to an actuating assembly to operate a displaceable component (e.g. a keeper plate) of a latching system between operative and inoperative conditions in response to a signal received via an electromagnetic signal (such as a signal from a telecommunications network).

Disengageable locks are known. For instance, CH446,108 "Tresorschloss" describes a lock wherein a first key actuates a link to engage an unlocking mechanism, and a second key causes the engaged unlocking mechanism to retract a lock bolt to an unlocked condition. Similar disengageable locks are described in DE433,321, DE503,560, DE4,441,834, GB2,206,638 "Electromechanical lock", GB2,313,148 "Locks", EP2,562,333 "Automotive and transportation control systems", WO 99/18311 "Closing device for a lock", US2014/0197920 "Methods of configuring and using a wireless communications device", U.S. Pat. No. 3,785,188 "Magnetic controlled door lock", U.S. Pat. No. 4,580,424 "Single lever, double changeable safe deposit lock", U.S. Pat. No. 4,656,852 "Lock with a double locking mechanism for a safe, bank compartment or the like", U.S. Pat. No. 5,219,386 "Locker unit comprising a plurality of lockers" and U.S. Pat. No. 5,701,828 "Electronic security system".

Furthermore, disengageable locks that engage upon receipt of a remote signal are known. For instance, EP0168884 "Locks" describes a key-releasable lock with a link incorporated in the unlocking mechanism, which link is movable by an electromagnetic actuator in response to a signal received by the lock between: an engaged position, in which the key-releasable lock may be operated; and a disengaged position, in which the lock may not be retracted to an unlocked position. Similar arrangements are described in EP0231532 "A lock having an external bolt unlocking device", US2009/0049878 "Lock cylinder opening system and method" and U.S. Pat. No. 4,850,623 "Locking mechanisms".

A drawback of known system is that the disengageable latching system/lock may not be engaged by one of a group of roaming persons (irrespective of the location of such persons) and, after engagement, known disengageable locks do not automatically disengage after expiry of a predetermined time from receipt of a remote signal from a roaming person.

It is an object of the present invention to provide an actuating assembly for a latching system that addresses this drawback.

SUMMARY OF THE INVENTION

According to a preferred embodiment of the present invention there is provided an actuating assembly to operate a displaceable component of a latching system, the actuating assembly includes:

- a first member which is connected or connectable to the displaceable component of the latching system;
- a second member, the first and second members being disconnectably connectable to each other, with the first and second members being in an inoperative configuration when they are disconnected from each other such that the second member is displaceable independently of the first member, and the first and second members being in an operative configuration when they are connected to each other such that displacement of the second member causes the first member to be displaced;
- a first actuating sub-assembly including a first key receiver for receiving a non-mechanical first key in the form of a predetermined electromagnetic signal transmitted via a cellular telecommunications network;
- a second actuating sub-assembly which is operable by a second key, the second actuating sub-assembly being operably connected to the second member and being configured, when actuated by the second key, to cause the second member to be displaced, thereby to cause the first member to be displaced when the first and second members are in their operative configuration; and
- a timer for determining the time from receipt of a first key by the first actuating sub-assembly, wherein the first actuating sub-assembly is configured, upon: (i) receipt of the first key, to cause the first and second members to assume their operative configuration; and (ii) elapse of a preset time measured by the timer from receipt of a first key by the first actuating sub-assembly, to cause the first and second members to assume their inoperative configuration.

In use, the first member may be directly connected or connectable to the displaceable component of the latching system, in which case an output drive member of the actuating assembly is provided by the first member. Instead, the first member may be indirectly connected or connectable to the displaceable component of the latching system, in which case the actuating assembly's output drive member, which may for example be or include a projecting element or arm connected or connectable to the displaceable component of the latching system, may be directly or indirectly connected to the first member, with displacement of the first member causing the output drive member to be displaced.

The latching system is typically for latching a closure member or door to a support structure on which the closure member or door is mounted. The support structure may be a static enclosure or a mobile enclosure. The enclosure may for example be a safe, electrical box, electrical sub-station, truck, delivery van or shipping container.

The first actuating sub-assembly may include a solenoid or an electric motor, e.g. a servomotor, or a linear actuator or an electromagnetic clutch for connecting the first and second members to each other.

In an embodiment of the invention, the first actuating sub-assembly includes a displaceable connecting component and a drive means, e.g. a solenoid, an electric motor or a linear actuator, which includes an output drive member which is connected to the connecting component, the connecting component being displaceable between a connecting position in which it connects the first and second members to each other and a non-connecting position in which it does not connect the first and second members to each other. The first actuating sub-assembly may include a non-mechanical key identification means, with the drive means being linked to the non-mechanical key identification means such that the drive means is operative in response to a signal received from the non-mechanical key identification means to cause displacement of the connecting component from its non-connecting position to its connecting position. The first actuating sub-assembly may be configured such that, after elapse of a preset time measured by the timer, the drive means is operative to cause displacement of the connecting component from its connecting position to its non-connecting position.

The first key, when in the form of an electromagnetic signal, may be encoded, with the key identification means including a decoder to decode the electromagnetic signal.

The actuating assembly may include a first key receiver for receiving the first key, when in the form of an electromagnetic signal.

The actuating assembly may include an electronic controller.

The actuating assembly may include location determining means for determining the location, e.g. the GPS co-ordinates, of the actuating assembly.

The actuating assembly may include storage means for storing an area or location, e.g. the GPS co-ordinates of a location, in which actuation of the first actuating sub-assembly is permitted.

The electronic controller may be configured to permit actuation of the first actuating sub-assembly only when the actuating assembly is at the location or within a specified distance from the location. Thus, for example, for applications where the actuating system is used to operate a component of a latching system for latching a closure member or door to a mobile enclosure, e.g. a motor vehicle, the actuating assembly may include storage means for storing a destination location, e.g. GPS co-ordinates, of the mobile enclosure, with the controller being configured to permit actuation of the first actuating sub-assembly only when the actuating assembly is within a specified distance from the destination location.

The actuating assembly may include a stored location management facility for managing, from a remote location, the area or location stored in the storage means in which actuation of the first actuating sub-assembly is permitted. Thus, with the stored location management facility, the area or location stored in the storage means may be inputted or modified from a remote location.

The actuating assembly may include real time location reporting means for real time reporting, e.g. by emitting a message via an electromagnetic signal to a remote location, on the location of the actuating assembly.

The actuating assembly may further include storage means for storing the co-ordinates of a desired route. The actuating assembly may include route deviation notifying means for notifying, e.g. by emitting a message via an electromagnetic signal to a remote location, when the location of the actuating assembly does not fall along the stored route. The actuating assembly may include a stored route management facility for managing, from a remote location, the route stored in the storage means. Thus, with the stored route management facility, the route stored in the storage means may be inputted or modified from a remote location.

The first actuating sub-assembly may be operably connected to at least one of the first member and the second member. In particular, at least one of the first and second members may include the displaceable connecting component, the connecting component being connected, e.g. pivotally connected, to the remainder of the first or second member, as the case may be, with the connecting component being receivable within a complementary receiving formation defined by the other member, thereby to connect the first and second members to each other. In an embodiment of the invention, the first member includes the connecting component and the second member defines at least one complementary receiving formation for receiving the connecting component, with the first actuating sub-assembly being operably connected to the connecting component so as to cause displacement of the connecting component from its non-connecting position to its connecting position in response to a signal received from the non-mechanical key identification means.

The first and second members may be rotatably displaceable such that, when the first and second members are in their operative configuration, rotary displacement of the second member causes rotary displacement of the first member.

The first member may define a circular aperture. The second member may be located within the aperture of the first member.

In an embodiment of the invention, the first member includes an outwardly projecting arm, with the arm being connected or connectable to the displaceable component of the latching system.

Instead, in another embodiment of the invention, the first member is connected to a linear toothed component, the linear, toothed component in effect providing, or being in the form of, a linear or rack gear, with the linear toothed component being connected or connectable to the displaceable component of the latching system. More particularly, the first member may have a toothed portion which extends at least partially around a periphery of the first member, with the toothed portion of the first member engaging with the toothed portion of the linear or rack gear.

In use, the actuating assembly may be installed on a door frame or surrounds. The displaceable component of the latching system to which the first member is connected may be a displaceable keeper plate which is connected to the door frame or surrounds in a manner such that a degree of displacement of the keeper plate relative to the door frame or surrounds is permitted, the keeper plate defining one or more apertures for receiving one or more latches mounted on the closure member or door. The or each latch may define an upwardly opening groove within which the displaceable keeper plate is captured by abutment of the keeper plate against a wall of the groove when the latch is in a latched position in which it is fast with the door frame or surrounds. Displacement of the first member may operate the latch to unlatch it by causing the displaceable keeper plate to be displaced upwardly so that it is no longer captured within the groove, thus permitting the or each latch to be withdrawn from the aperture of the displaceable keeper plate.

The second key may be a mechanical or non-mechanical key. In a preferred embodiment of the invention, the second actuating sub-assembly includes a mechanical lock mechanism which defines a passage or keyway for receiving a mating mechanical key. The second actuating sub-assembly may be configured to displace the second member when a mating key received in the passage or keyway is rotated. For example, the second actuating sub-assembly may include a drive member which is operably connected to the second member, with the lock mechanism being configured to displace the drive member, with displacement of the drive member causing the second member to be displaced. Instead, the second member may be a drive member of the lock mechanism, the lock mechanism being configured to displace the drive member when a mating key received in the passage or keyway is rotated.

The invention extends to a security system which includes:

a latching system to latch a door to surrounds of the door;

an actuating assembly to operate a displaceable component of the latching system to latch or unlatch the door, the actuating assembly including:

a first member which is connected or connectable to the displaceable component of the latching system;

a second member, the first and second members being disconnectably connectable to each other, with the first and second members being in an inoperative configuration when they are disconnected from each other such that the second member is displaceable independently of the first member, and the first and second members being in an operative configuration when they are connected to each other such that displacement of the second member causes the first member to be displaced; a first actuating sub-assembly which is operable by a first key and is configured, when actuated by the first key, to cause the first and second members to assume their operative configuration, and a second actuating sub-assembly which is operable by a second key, the second actuating sub-assembly being operably connected to the second member and being configured, when actuated by the second key, to cause the second member to be displaced, thereby to cause the first member to be displaced when the first and second members are in their operative configuration;

a first key emitter for emitting a first key to operate the first actuating sub-assembly, the first key being in the form of an electromagnetic signal; and a second key to operate the second actuating sub-assembly.

The latching system may be as hereinbefore described.

The first and second keys may be as hereinbefore described.

The latching system is typically for latching a closure member or door to a support structure on which the closure member or door is mounted. The support structure may be a static enclosure or a mobile enclosure. The enclosure may for example be a safe, electrical box, electrical sub-station, truck, delivery van or shipping container.

The security system may include storage means for storing an area or location, e.g. the GPS co-ordinates of a location, in which actuation of the first actuating sub-assembly is permitted. The storage means may be proximate to, or part of, the actuating assembly or may be remote from the actuating assembly.

The actuating assembly may include an electronic controller.

The security system may include location determining means for determining the location, e.g. the GPS co-ordinates, of the actuating assembly.

The security system may include storage means for storing an area or location, e.g. the GPS co-ordinates of a location, in which actuation of the first actuating sub-assembly is permitted.

The electronic controller may be configured to permit actuation of the first actuating sub-assembly only when the actuating assembly is at the location or within a specified distance from the location.

The security system may include a stored location management facility for managing, from a remote location, the area or location stored in the storage means in which actuation of the first actuating sub-assembly is permitted. Thus, with the stored location management facility, the area or location stored in the storage means may be inputted or modified from a remote location.

The security system may include real time location reporting means for real time reporting, e.g. by emitting a message via an electromagnetic signal to a remote location, on the location of the actuating assembly.

The security system may further include storage means for storing the co-ordinates of a desired route. The security system may include route deviation notifying means for notifying, e.g. by emitting a message via an electromagnetic signal to a remote location, when the location of the actuating assembly does not fall along the stored route. The security system may include a stored route management facility for managing, from a remote location, the route stored in the storage means. Thus, with the stored route management facility, the route stored in the storage means may be inputted or modified from a remote location.

The actuating assembly may be as hereinbefore described.

BRIEF DESCRIPTION OF THE DRAWINGS

The invention will now be described in more detail, by way of examples only, with reference to the accompanying drawings in which.

DESCRIPTION OF THE INVENTION

Figure 1:
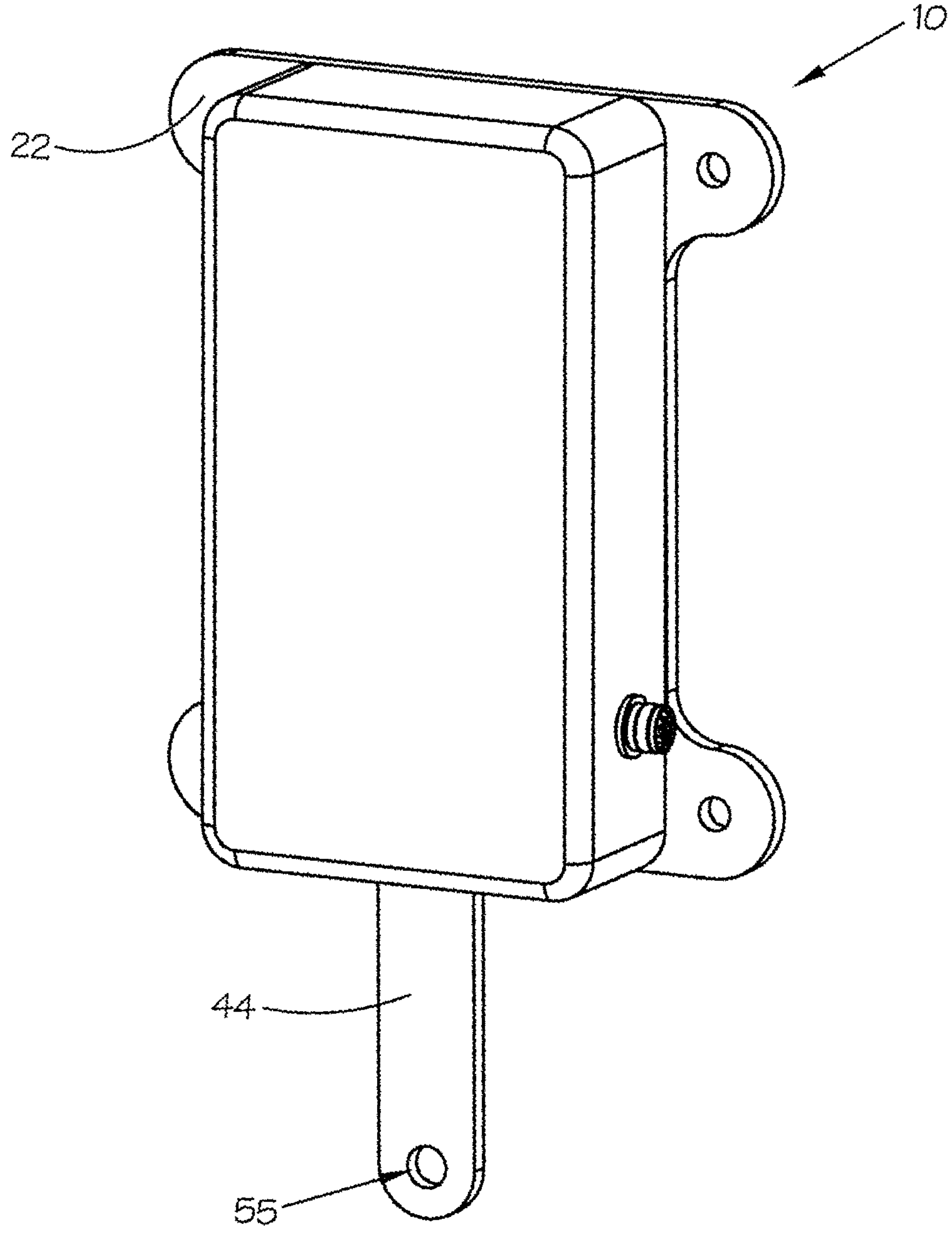
FIG. 1 is a three-dimensional view of a first embodiment of an actuating assembly in accordance with the invention.

Referring to FIGS. 1 to 11, a first embodiment of a lock in accordance with the invention is generally designated by reference numeral 10.

Figure 2:
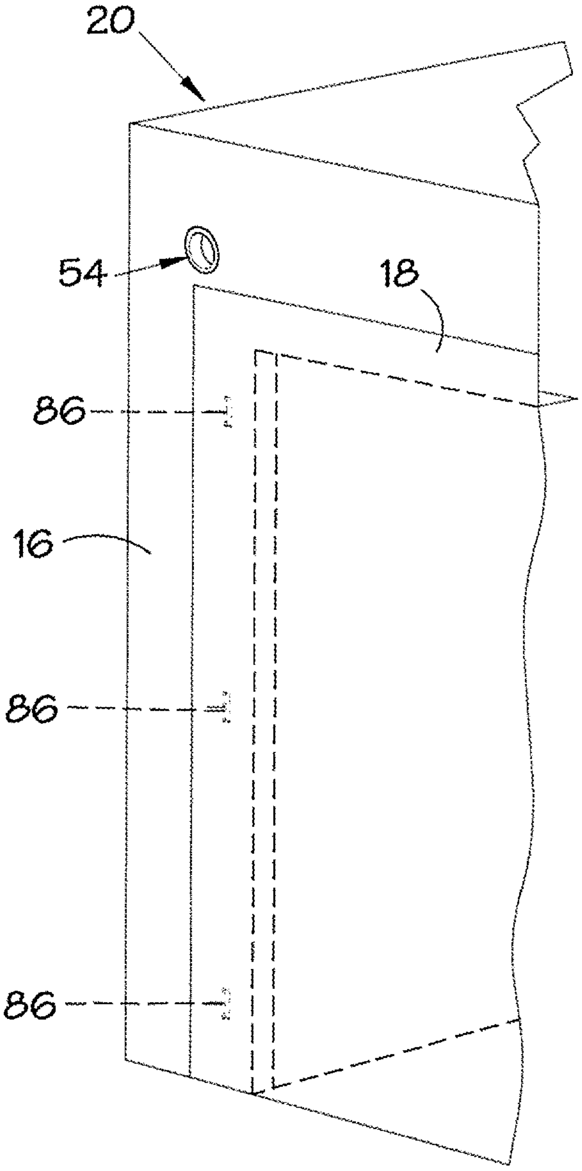
FIG. 2 is a three-dimensional exterior view of a support structure in which the actuating assembly of FIG. 1 is installed.
Figure 3:
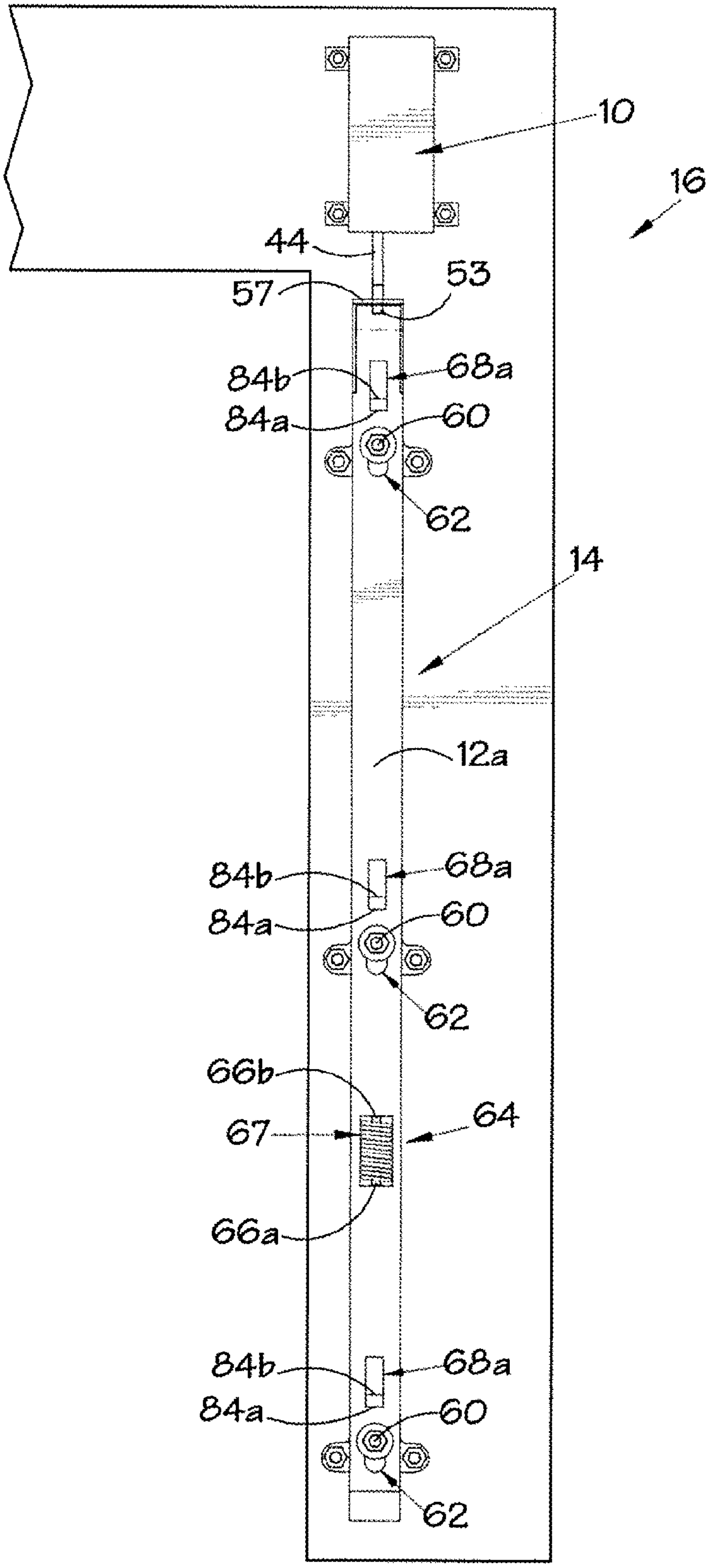
FIG. 3 is an interior view of a portion of the support structure of FIG. 2 showing the installed actuating assembly of FIG. 1, and showing keeper plates of a latching system to which the actuating assembly is connected.

Referring to FIGS. 1 to 11, a first embodiment of an actuating assembly in accordance with the invention is generally designated by reference numeral 10. The actuating assembly 10 is for operating a displaceable keeper plate 12*a* of a latching system 14, a portion of which is shown in FIG. 3. It will, however, be appreciated that the actuating assembly 10 could instead operate a wide variety of other kinds of latching systems (not shown).

Figure 11:
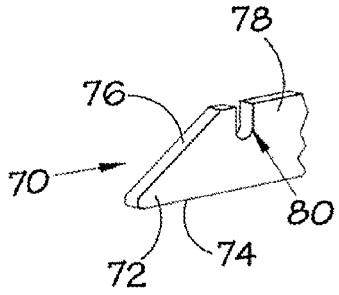
FIG. 11 shows one of the latches of the latching system.
Figure 12:
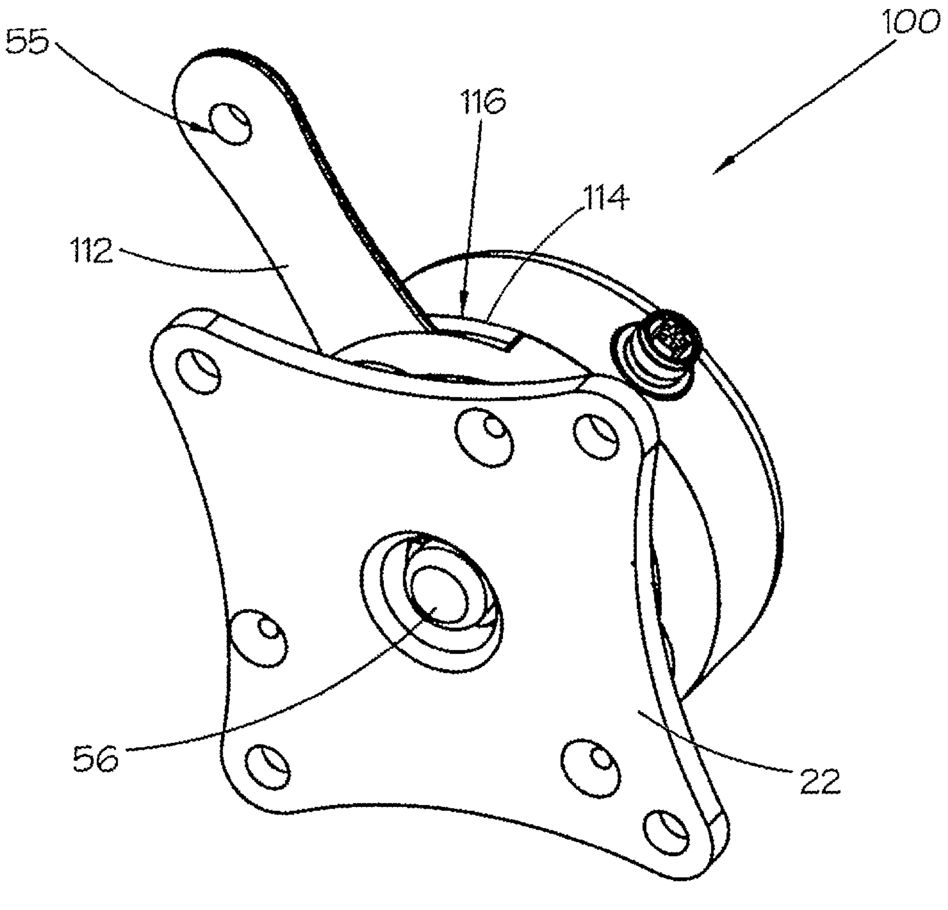
FIG. 12 is a three-dimensional view of a second embodiment of an actuating assembly in accordance with the invention.
Figure 13:
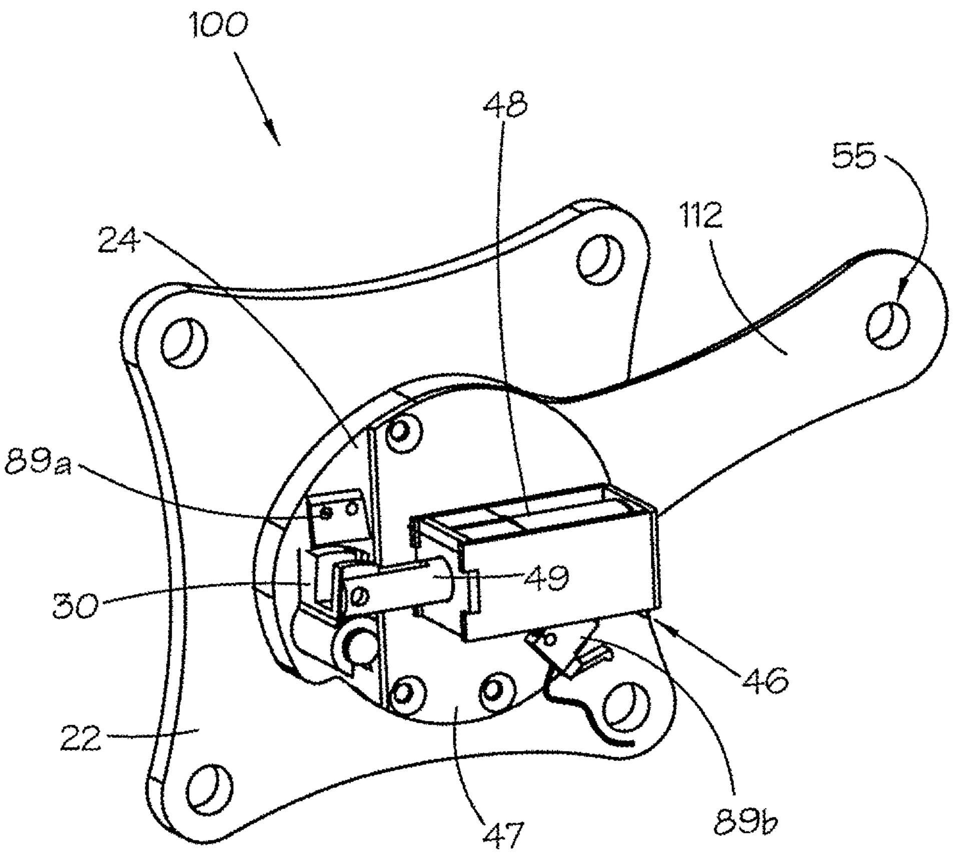
FIG. 13 is a three-dimensional view of the actuating assembly of FIG. 12, with a portion of its housing having been removed for illustrative purposes.

The latching system 14 includes a pair of keeper plates 12*a*, 12*b* (see FIG. 9) and three latches 70 (one of which is shown in FIG. 11). The keeper plate 12*a* is connected to the keeper plate 12*b* as is more fully described below. As shown in FIGS. 2 and 3, the keeper plate 12*b* is affixed to a door surrounds 16 of a support structure 20 which includes a closure member or door 18. In this example the support structure 20 is a safe like enclosure. The door 18 is hinged on a side thereof (not shown) to the safe 20, e.g. by means of multi-pivot point hinges which each include a plurality of pivot pins arranged in series.

Figure 5:
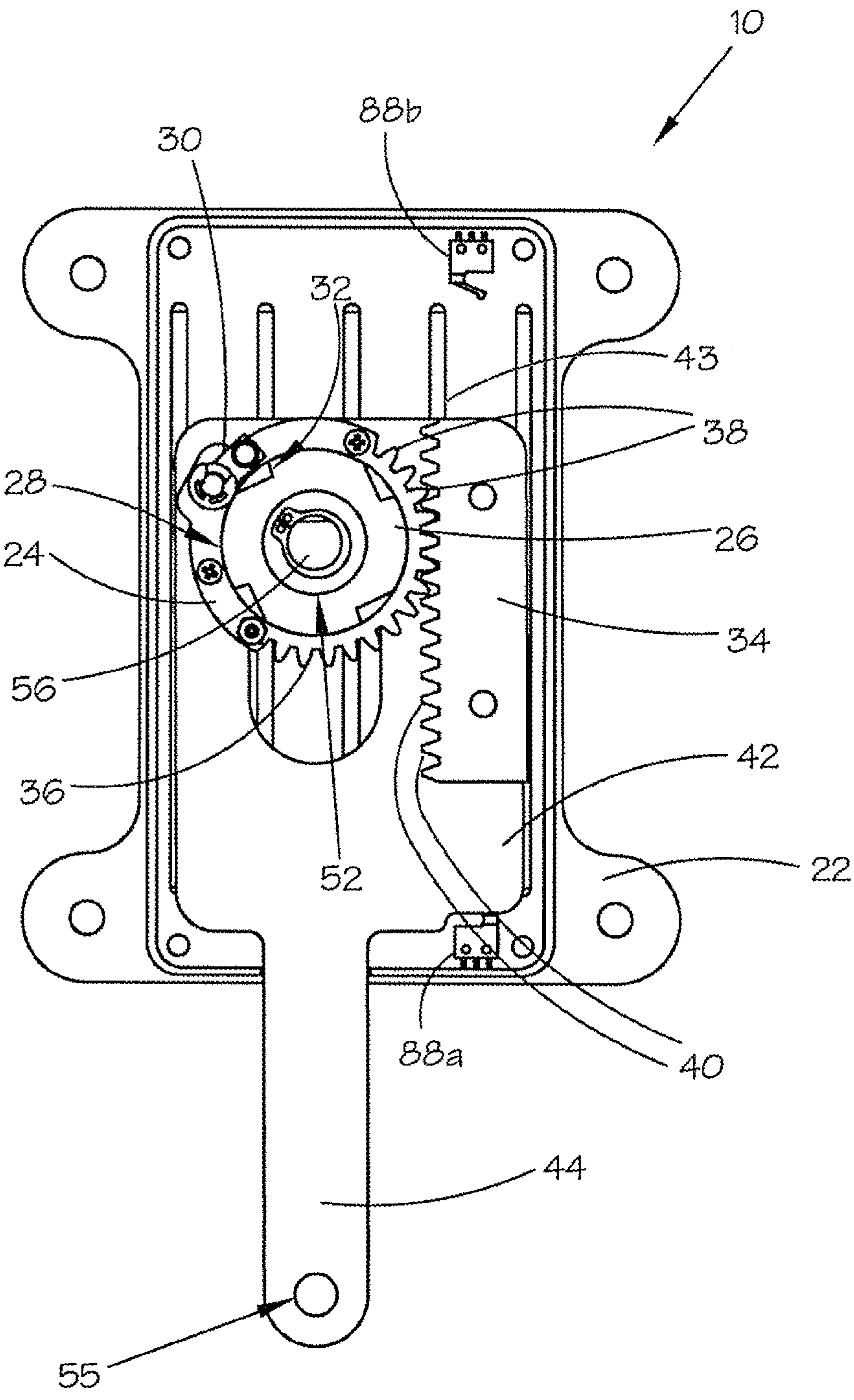
FIG. 5 is another face-on view of the actuating assembly of FIG. 1, with a portion of its housing, its solenoid and its solenoid mounting plate having been removed for illustrative purposes, showing rotatable first and second members of the lock in an inoperative configuration.
Figure 6:
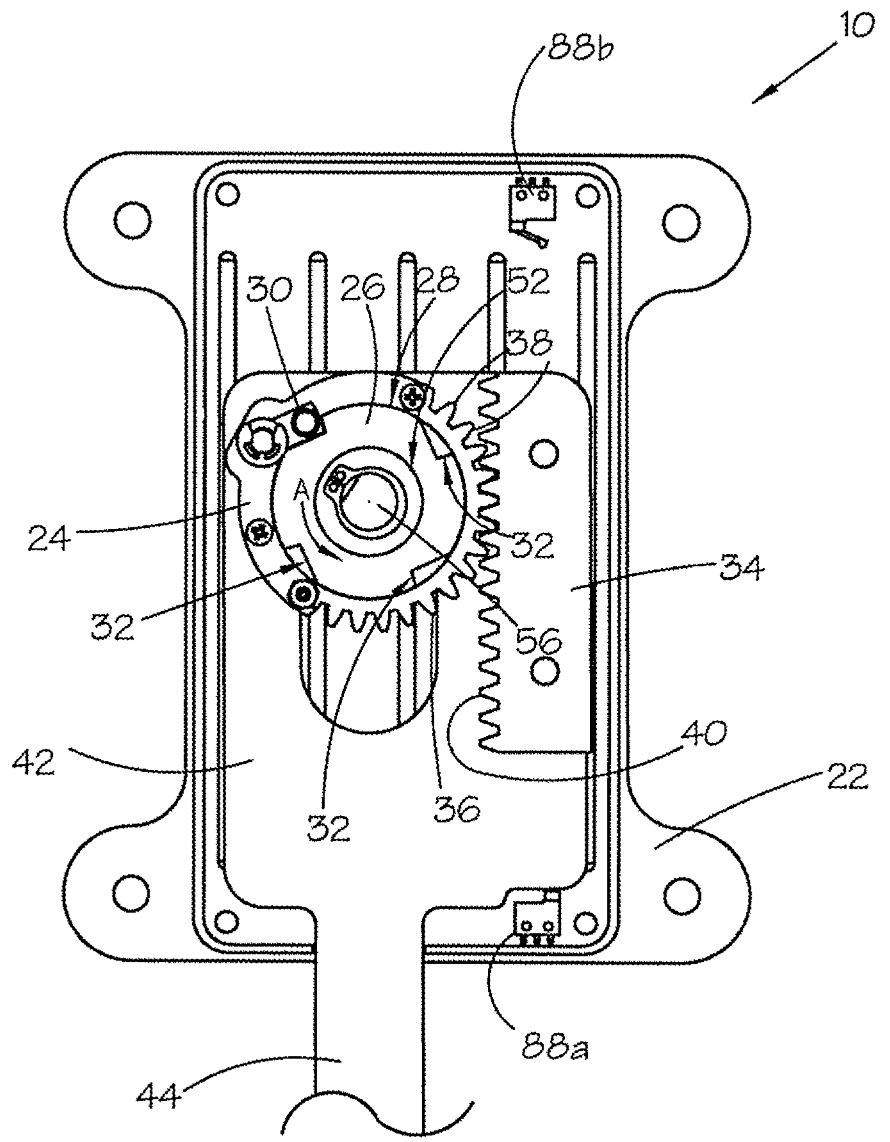
FIG. 6 is another face-on view of the actuating assembly of FIG. 1, with a portion of its housing, its solenoid and its solenoid mounting plate having been removed for illustrative purposes, showing the first and second members in an operative configuration.
Figure 7:
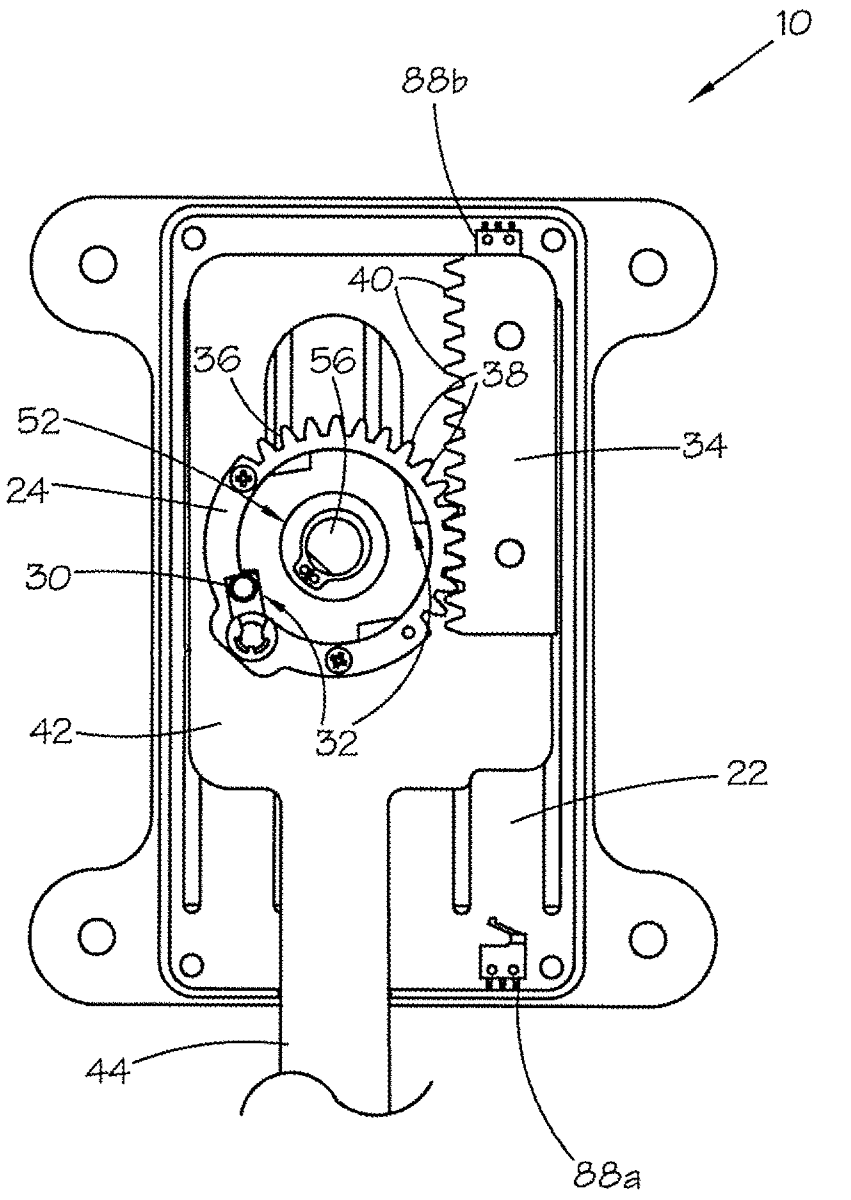
FIG. 7 is another face-on view of the portion of the actuating assembly of FIG. 1, with a portion of its housing, its solenoid and its solenoid mounting plate having been removed for illustrative purposes, in which the first and second members are in an operative configuration, with the first and second members having been rotated from their positions in FIG. 6.

The actuating assembly 10 includes a body or housing 22, a first member 24 and a second member 26 (as best seen in FIGS. 5 to 7).

The first member 24 is annular, the first member 24 defining a central, circular aperture 28. The second member 26, which is also annular, is located within the aperture 28. The second member 26 is co-axial with the first member 24. The first member 24 includes a pivotable connecting component 30. The second member 26 defines on its periphery a plurality of circumferentially spaced receiving formations 32 which are in the form of notches. The connecting component 30 is receivable within the receiving formations 32, the first and second members 24, 26 being connected to each other when the connecting component 30 is received in one of the receiving formations 32, reminiscent of a ratchet comprising a gear and a pawl, but with the pawl not being biased towards the gear.

The first member 24 is also connected to a linear toothed component 34, the linear, toothed component 34 in effect providing, or being in the form of, a linear or rack gear. The first member 24 has a toothed portion 36 (shown in FIG. 5) which extends partially around the circumference of the first member 24, with teeth 38 (shown in FIG. 5) of the first member 24 engaging with teeth 40 of the linear or rack gear 34. The linear or rack gear 34 is affixed to a sliding plate 42, which is slidably connected to the housing 22, a rear side of the sliding plate 42 defining longitudinally extending parallel grooves (not shown) in which complementary, parallel ribs 43 defined by the housing 22 are received. The sliding plate 42 includes a projecting arm 44 at an operatively lower end thereof which is connected to the latching system 14.

Figure 4:
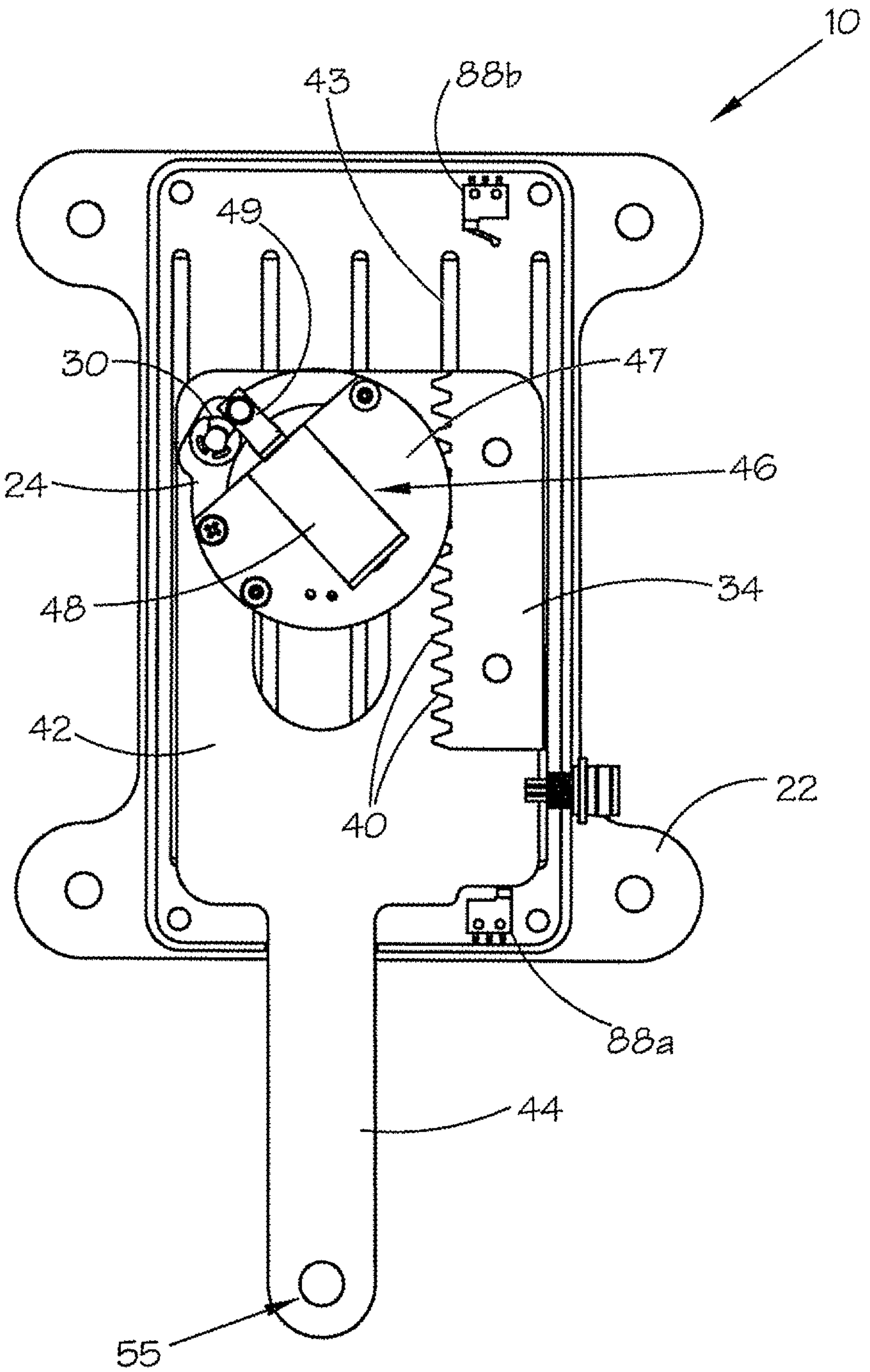
FIG. 4 is a face-on view of the actuating assembly of FIG. 1, a portion of its housing having been removed for illustrative purposes.

As best seen in FIG. 4, the actuating assembly 10 includes a first actuating sub-assembly 46 which is operable by a first key, the first key being a non-mechanical key in the form of an identifying electromagnetic signal. The identifying electromagnetic signal is transmitted by a cellular telecommunications network, and can be triggered by a cellular telephone. Alternatively, the signal could be emitted by a remote control device (not shown). The first actuating sub-assembly 46 includes a non-mechanical key identification means (not shown) for identifying the signal. The first actuating sub-assembly 46 includes a solenoid 48 (FIG. 4) which is mounted on the first member 24 via a plate 47. The solenoid 48 is connected to the connecting component 30 via an output drive shaft 49 of the solenoid 48. The solenoid 48 is linked to the non-mechanical key identification means such that it is operative, in response to the signal, to cause the drive shaft 49 to be displaced such that the connecting component 30 is pivoted in a direction towards the second member 26 so that the connecting component 30 is received in one of the receiving formations 32 defined on the circumference of the second member 26, thereby to connect the first and second members 24, 26 to each other.

The actuating assembly 10 also includes a second actuating sub-assembly which includes a mechanical lock mechanism (not shown) and a drive member 56, the lock mechanism being accessible via a keyhole 54 (FIG. 2). The lock mechanism (not shown) defines a passage or keyway (not shown) for receiving a mating mechanical key (not shown). The drive member 56 is co-axial with the annular second member 26, with the second member 26 being rotatably fast with the drive member 56. The lock mechanism (not shown) is configured to rotatably displace the drive member 56, with said displacement of the drive member 56 causing the second member 26 to be rotatably displaced.

Figure 8:
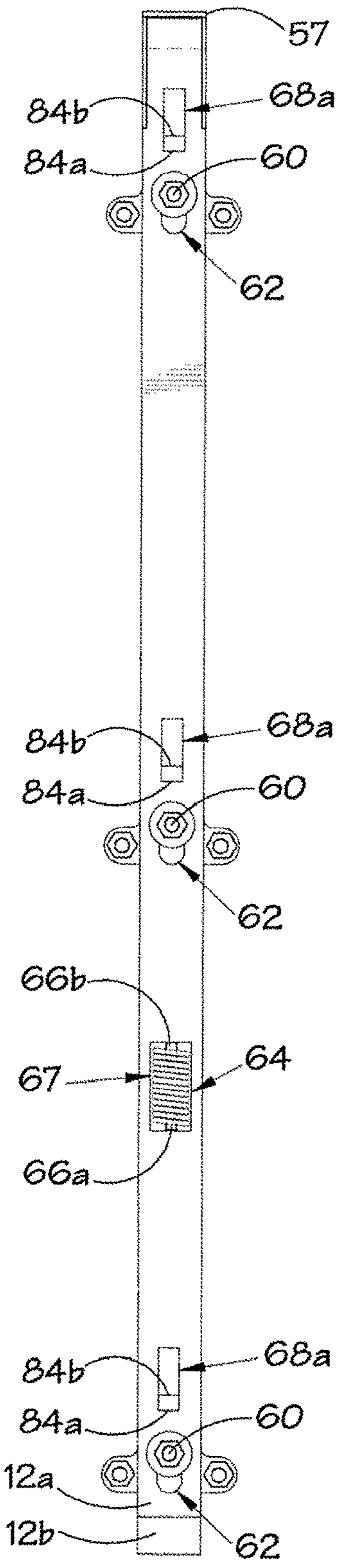
FIG. 8 is a face-on view of the keeper plates of the latching system shown in FIG. 3.
Figure 9:
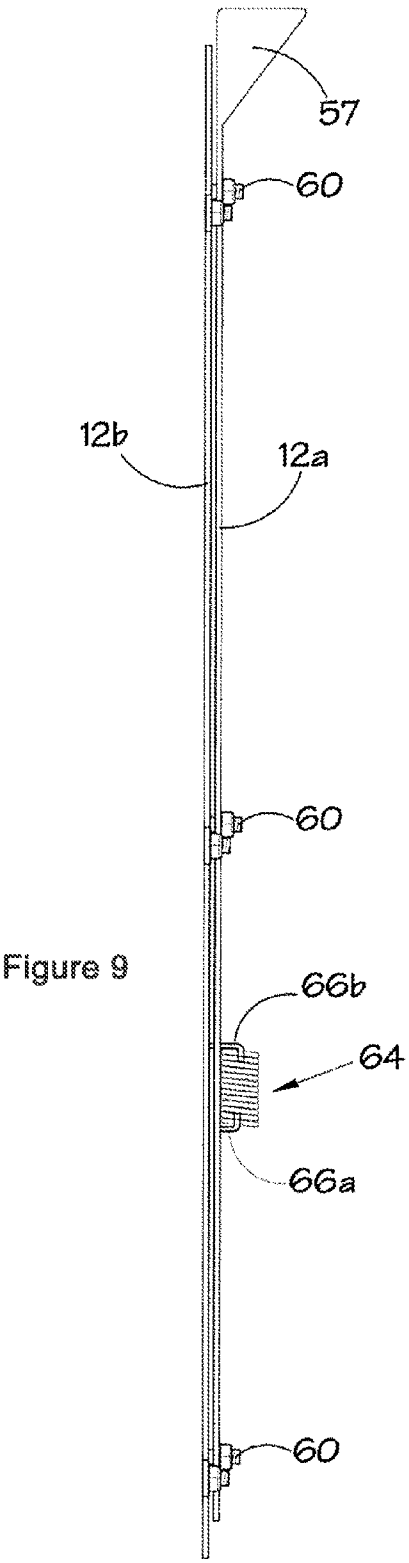
FIG. 9 is a side view of the keeper plates of the latching system shown in FIG. 3.
Figure 10:
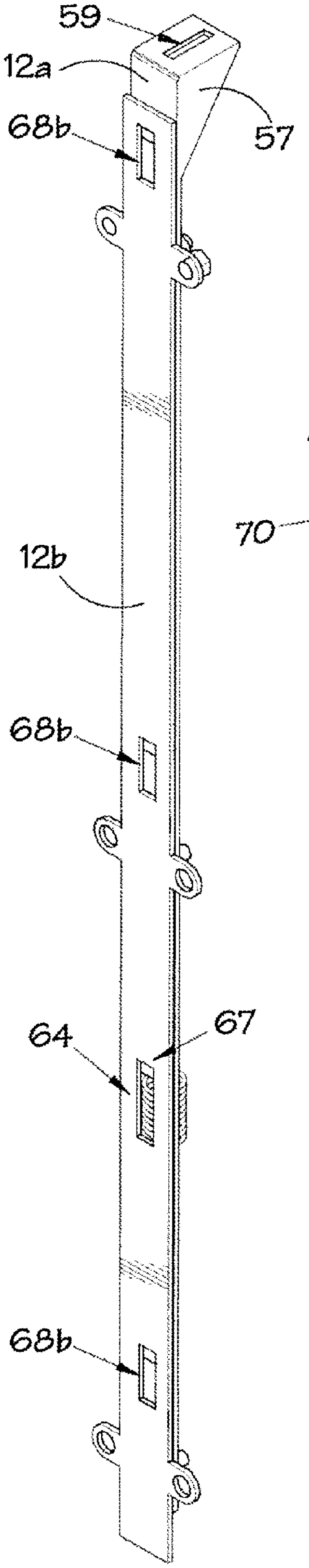
FIG. 10 is a three-dimensional view of the keeper plates of the latching system shown in FIG. 3.

As best seen in FIG. 3, a connecting member 53 connects the arm 44 of a connecting formation 57 at an upper end of the keeper plate 12*a* of the latching system 14. In particular, the connecting member 53 is threaded through an aperture 55 defined in the arm 44 and extends through an elongate opening 59 defined in a top of the connecting formation 57. The top of the connecting formation 57, i.e. on opposite sides of the opening 59, is supported on a lower end of the connecting member 53. The keeper plate 12*b* includes lugs which are fastened to the door surrounds 16. The displaceable keeper plate 12*a* is connected to the keeper plate 12*b* via fasteners 60 which are received in elongate slots 62 (FIGS. 3 and 8). Furthermore, a coil spring 64 is captured between a pair of operatively lower and upper L-shaped arms 66*a* and 66*b* (FIG. 9). The arm 66*a* is defined by the keeper plate 12*a*. The arm 66*b* is defined by the keeper plate 12*b* and extends through an aperture 67 defined by the keeper plate 12*a*, the top of the aperture 67 being adjacent the arm 66*b*.

The keeper plate 12*a* defines three vertically spaced, latch-receiving apertures 68*a*, and the keeper plate 12*b* defines three vertically spaced, latch-receiving apertures 68*b*. The door 18 includes three vertically spaced latches 70 (one of which is shown in FIG. 11) which are fixedly attached to the door 18 and are receivable by the apertures 68*a*, 68*b*. Each latch 70 has a tapered end portion 72 which is generally triangular in profile and includes a horizontally extending bottom 74 and an upwardly inclined side 76. The latch 70 is affixed to the door 18 via a widened portion 78 of the latch 70. The portion 78 defines an upwardly opening groove 80 which extends transversely through the latch 70. As shown in FIGS. 3 and 8, prior to the insertion of the latches 70 in the apertures 68*a*, 68*b*, the apertures 68*b* are partially in register with the apertures 68*a* (the apertures 68*a*, 68*b* being slightly vertically offset), with the bottom wall or floor 84*b* of the apertures 68*b* being slightly above the bottom walls or floors 84*a* of the apertures 68*a*, and with the apertures 68*a*, 68*b* being sufficiently in register to permit the tip of the tapered end portion 72 of each latch 70 to extend through one of the pairs of partially registering apertures 68*a*, 68*b*. The apertures 68*b* of the keeper plate 12*b* are in register with vertically spaced apertures 86 defined in the door surrounds 16.

In use, when the door 18 is latched to the door surrounds 16, the keeper plate 12*a* is captured between the walls of the grooves 80 of the latches 70, abutment of the keeper plate 12*a* against the walls of the grooves 80 inhibiting unlatching and displacement of the door 18, and the first member 24 and second member 26 are in their disconnected, inoperative configuration shown in FIGS. 4 and 5. When the first and second members 24, 26 are disconnected from each other, displacement of the second member 26 does not cause the first member 24 to be displaced. When the door 18 is required to be unlatched, the actuating assembly 10 is used to displace the keeper plate 12*a* upwardly so that the apertures 68*a* are entirely in register with the apertures 68*b* as described below.

In particular, to connect the first member 24 to the second member 26 so that the first and second members 24, 26 assume their operative configuration, the first actuating sub-assembly 46 is activated by means of the electromagnetic signal from a cellular telecommunications network or a remote control device (not shown). The signal is detected by the key identification means (not shown) and, if there is a positive identification by the key identification means that the signal is the correct signal, the solenoid 48 is activated to displace its drive shaft 49 so as to cause the connecting component 30 to pivot towards the second member 26 so that the connecting component 30 is received in the neighbouring receiving formation 32, thereby connecting the first and second members 24, 26 to each other, as shown in FIG. 6.

Thereafter, a mating mechanical key (not shown) is inserted via the keyhole 54 into the passage or keyway (not shown) of the lock mechanism (not shown) so that the key engages with elements (not shown) of the lock mechanism such that rotation of the key causes the drive member 56 to rotate in the direction of arrow "A" in FIG. 6. The rotation of the drive member 56 causes the second member 26 and the first member 24 to rotate with it. The teeth 38 of the first member 24 mesh with the teeth 40 of the linear or rack gear 34, which causes the first member 24 to be linearly upwardly displaced until it reaches the position shown in FIG. 7. The actuating assembly includes two limit switches 88*a*, 88*b* for detecting the position of the sliding plate 42 and thus whether the actuating assembly 10 is in a locked or unlocked condition. When the arm 44 is in its lowered position shown in FIGS. 4 to 6, the sliding plate 42 closes the limit switch 88*a*. When the arm 44 is in its raised position shown in FIG. 7, the sliding plate 42 closes the limit switch 88*b*. The limit switches 88*a*, 88*b* are connected to an electronic controller (not shown), which in turn is connected to a display panel (not shown), for indicating whether the actuating assembly 10 is in a locked or unlocked condition.

As soon as the mechanical key is released from its unlocking position, biasing means in the form of a spring (not shown), causes the first and second members 24, 26 to disengage from each other. This allows sliding plate 42 to return to its biased locked position under the influence of the biasing means in the form of the aforementioned spring (not shown) and the spring 64. This causes the linear or rack gear 34 and the arm 44 to be automatically lowered.

As the arm 44 of the first member 24 is upwardly displaced, the keeper plate 12*a* is drawn upwardly with it, against the urging of the coil spring 64. When the first member 24 has reached its uppermost position shown in FIG. 7, the apertures 68*a* are entirely in register with the apertures 68*b*, and thus also with the apertures 86 of the door surrounds 16. Since in this position the keeper plate 12*a* is no longer captured between the walls of the grooves 80, the latches 70 can then be withdrawn from the keeper plates 12*a*, 12*b* and the door surrounds 16 so that the door 18 can be opened. The arm 44 thus acts as a linear output drive member of the actuating assembly 10.

When the door 18 is closed, the latches 70 are inserted into the apertures 86, 68*a* and 68*b*, the keeper plate 12*a* being pushed upwardly by the tapered end portions 72 of the latches 70, until the grooves 80 reach the keeper plate 12*a*, whereafter the coil spring 64 urges the keeper plate 12*a* downwardly into the grooves 80. In this position, the keeper plate 12*a* is captured within the grooves 80. For the unlatching of the latches 70, actuation of the actuating assembly 10, as described above, is required.

Referring to FIGS. 12 to 16, a second embodiment of an actuating assembly in accordance with the invention is generally designated by reference numeral 100. Unless otherwise indicated, like features to those of the actuating assembly 10 are designated by like reference numerals.

The actuating assembly 100 is similar to the actuating assembly 10 save that, instead of there being a linear or rack gear 34 and a sliding plate 42 with its projecting arm 44, an output drive member of the actuating assembly 100 is a projecting arm 112 of the first member 24. The arm 112 projects outwardly from an annular portion 114 of the first member 24 through a slot 116 defined by the housing 12. When the first member 24 is rotatably displaced, the arm 112 is rotatably displaced along with the remainder of the first member 24. It will be appreciated that the arm 112 provides a rotary output drive member for the actuating assembly 100.

As previously mentioned, the limit switches 88*a* and 88*b* detect whether the actuating assembly 100 is in its locked or unlocked condition. The switch 88*a* is activated by movement of the connecting component 30 and indicates whether or not the connecting component 30 has been displaced by the output drive shaft 49 of the solenoid 48, therefore indicating whether or not the first and second members 24 and 26 are connected. The switch 88*b* is activated by a pin 118 (shown in FIGS. 14 to 16) that protrudes from the base of the housing 22. The switch 88*b* is fast with the first member 24 and accordingly, when the first member 24 rotates, the switch 88*b* rotates with the first member 24. Thus, the switch 88*a* can detect whether or not the first and second members 24, 26 are in their operative configuration and the switch 88*b* can detect whether or not the first member 24 is in its home or locking position shown in FIGS. 13 to 15.

Figure 14:
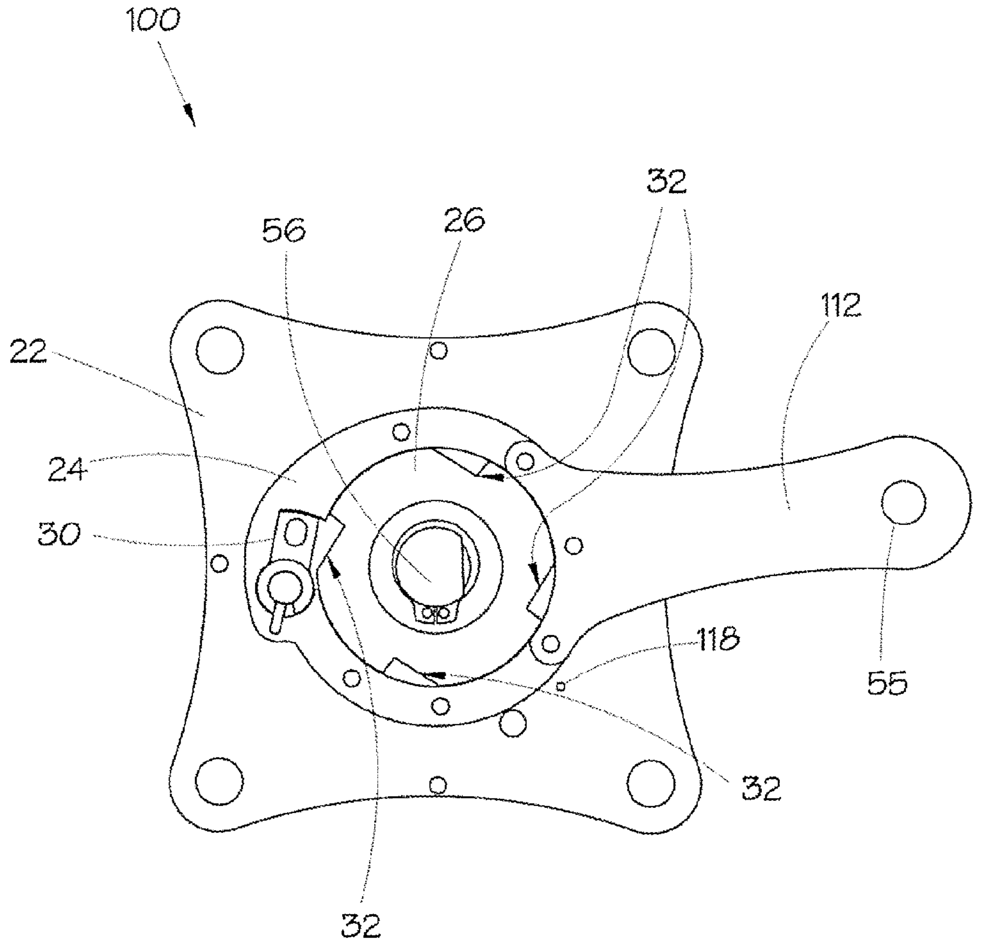
FIG. 14 is a face-on view of the actuating assembly of FIG. 12, with a portion of its housing, its solenoid and its solenoid mounting plate having been removed for illustrative purposes, showing rotatable first and second members of the lock in an inoperative configuration.
Figure 15:
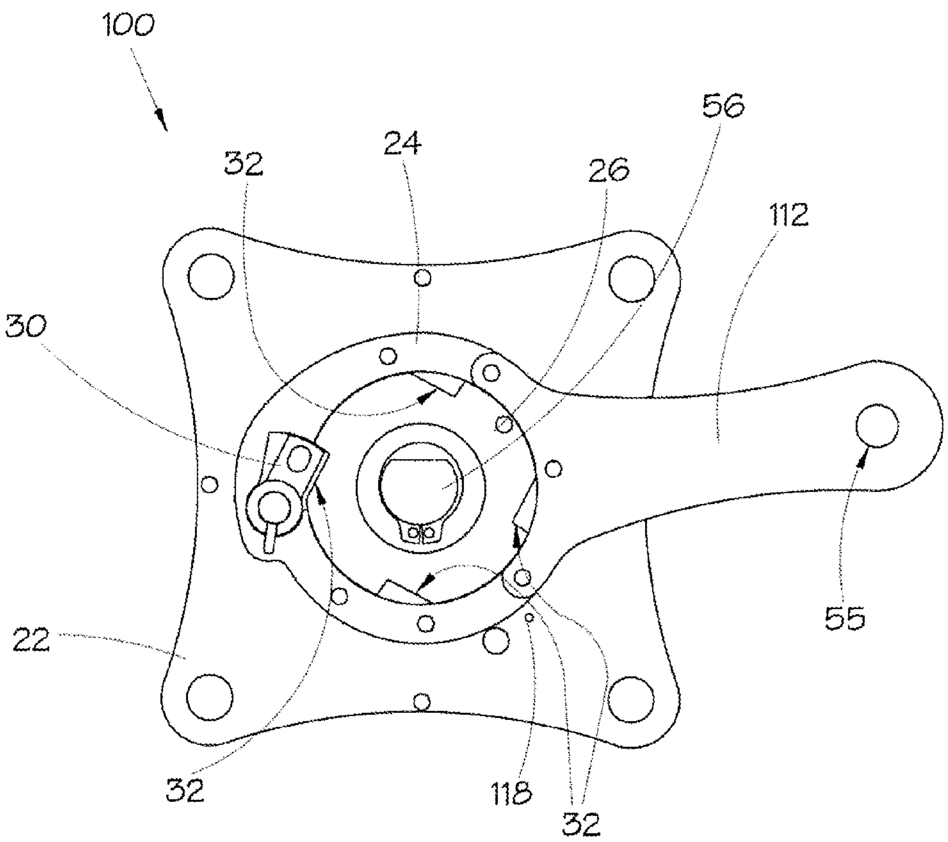
FIG. 15 is a face-on view of the actuating assembly of FIG. 12, with a portion of its housing, its solenoid and its solenoid mounting plate having been removed for illustrative purposes, showing the first and second members in an operative configuration.

In use, for connecting the first member 24 to the second member 26 so that the first and second members 24, 26 assume their operative configuration shown in FIG. 15 from their inoperative configuration shown in FIG. 14, the first actuating sub-assembly 46 is activated by means of the electromagnetic signal from the cellular telecommunications network or the remote control device (not shown). The signal is detected by the key identification means (not shown) and, if there is a positive identification by the key identification means that the signal is the correct signal, the solenoid 48 is activated to displace its output drive shaft 49 so as to cause the connecting component 30 to pivot towards the second member 26. In particular, the connecting component 30 pivots from the position shown in FIG. 14 towards the second member 26 so that the connecting component 30 is received in a neighbouring receiving formation 32, thereby connecting the first and second members 24, 26 to each other, as shown in FIG. 15.

Figure 16:
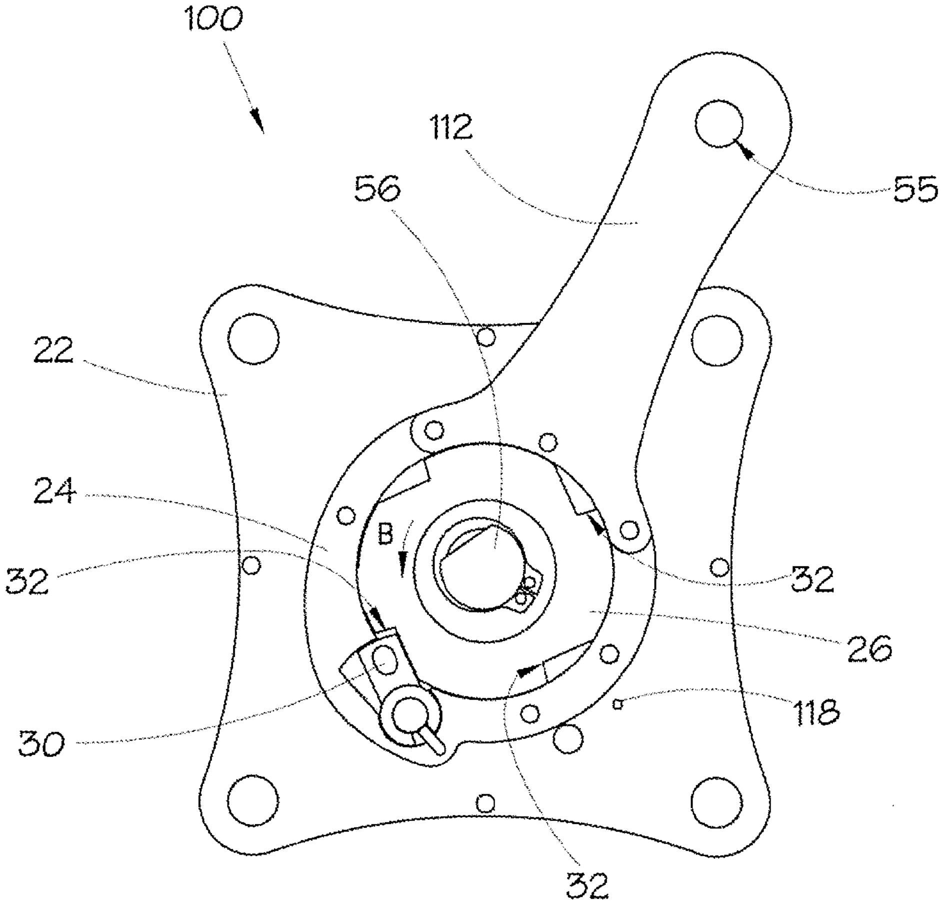
FIG. 16 is a face-on view of the actuating assembly of FIG. 12, with a portion of its housing, its solenoid and its solenoid mounting plate having been removed for illustrative purposes, in which the first and second members are in an operative configuration, with the first and second members having been rotated from their positions in FIG. 15.

Thereafter, a mating mechanical key (not shown) is inserted in the passage or keyway (not shown) of the lock mechanism (not shown) so that it engages with elements (not shown) of the lock mechanism such that rotation of the key causes the drive member 56 to rotate in the direction of arrow "B" in FIG. 16. The rotation of the drive member 56 causes the second member 26 and the first member 24 to rotate with it so that the arm 112 also rotates. In use, the arm 112 will be connected to a latching system (not shown) that requires a rotary output drive member. Once the mechanical key is released from its unlocking position, biasing means in the form of a spring (not shown), causes the first and second members 24, 26 to disengage from each other. This allows members 24, 112 to return to their biased locked position due to the influence of the biasing means in the form of the aforementioned spring (not shown) in the assembly and any (optionally) further springs in the latching mechanisms.

When the first member 24 is in its home of locking position, the pin 118 and the switch **88*b* are aligned with each other and the switch 88*b* is positively activated. During the unlocking procedure, as the first member 24 rotates away from its locking position, the switch 88*b* rotates with it, thereby causing the switch 88*b* to be displaced away from the pin 118 that protrudes from the base of the housing 22, thereby causing the state of the switch 88*b*** to change from a positively activated state to an off or non-activated state.

Figure 17:
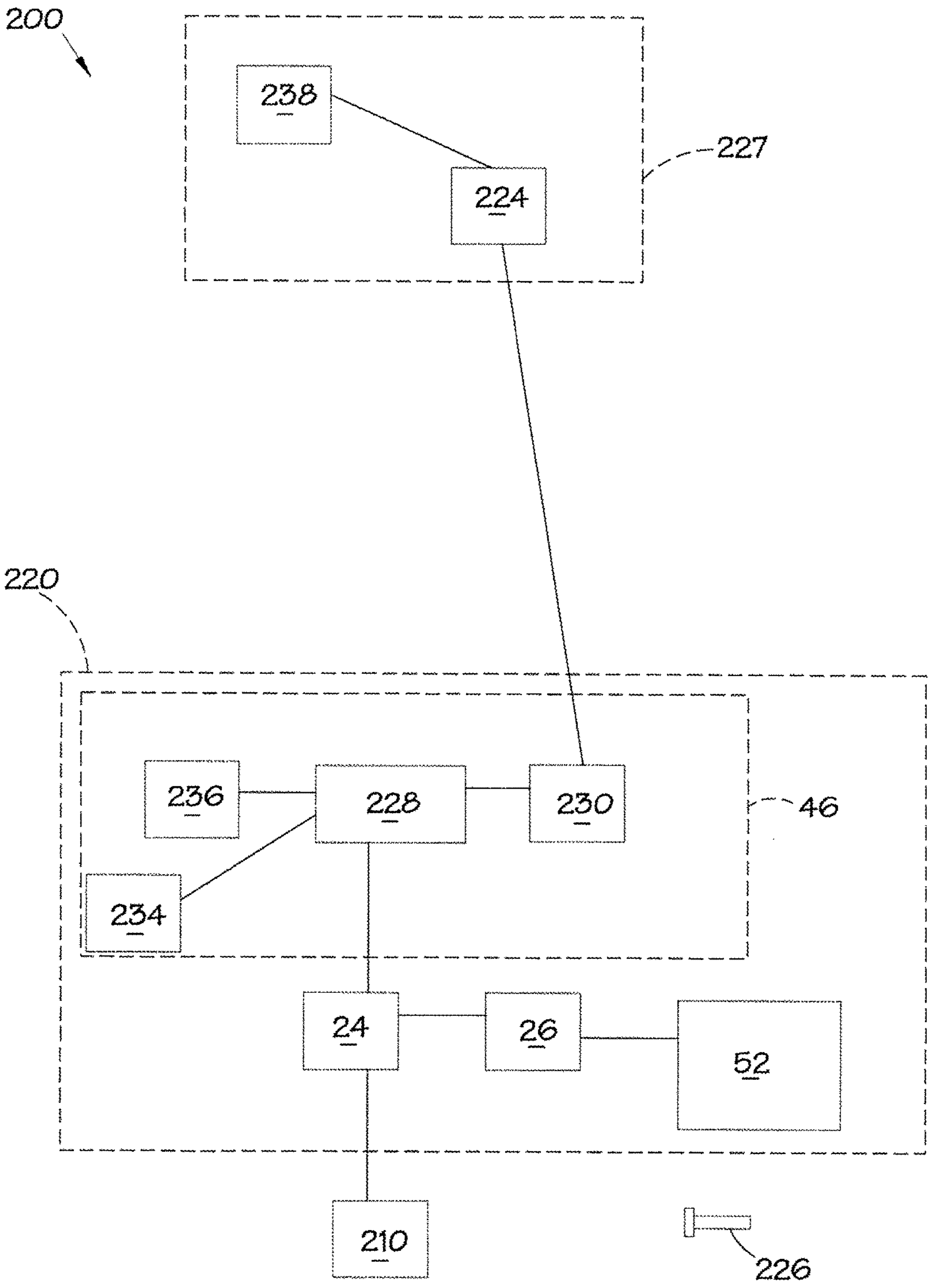
FIG. 17 is a schematic block diagram illustrating a security system in accordance with the invention.

Referring now to FIG. 17, a security or locking system in accordance with the invention is generally designated by reference numeral 200. Unless otherwise indicated, like features to those of the actuating assembly 10, 100 are designated by like reference numerals.

The security system 200 includes a latching system 210 to latch a door (not shown) mounted on a mobile enclosure (not shown), to surrounds of the door (not shown), an actuating assembly 220 to operate a displaceable component (not shown) of the latching system 210 to latch or unlatch the door, a communications facility 224 which includes a first key emitter for emitting a first key and a second key 226. In this example, the mobile enclosure is a motor vehicle. It will, however, be appreciated the security system 200 could be used with a wide variety of mobile enclosures. Access to a cargo area (not shown) of the motor vehicle (not shown) is controlled by means of the door (not shown) and the security system 200. The first key is in the form of an electromagnetic signal. The second key 226 is a mechanical key.

The actuating assembly 220 is same as the actuating assembly 100 described above, save that it has certain further features as described below. In this embodiment of the invention, the latching system 210 requires a rotary output drive member. It will be appreciated, however, that in an alternative embodiment of the invention (not shown), where the latching system 210 requires a linear output drive member, the actuating assembly may instead for example be the actuating assembly 10.

The first key is for operating the first actuating sub-assembly 46 of the actuating assembly 220. The second key 226 is for operating the second actuating sub-assembly 52 of the actuating assembly 220.

The communications facility 224 sends and receives electromagnetic signals and is part of a monitoring facility or installation 227 which is situated at a location remote from the motor vehicle. The first actuating sub-assembly 46 includes an electronic controller 228 and a communication means 230 for sending and receiving electromagnetic signals to enable communication with the remote installation 227.

The actuating assembly 220 includes a location determining means 234 for determining the location, in particular the GPS co-ordinates, of the actuating assembly 220, and hence of the motor vehicle (not shown) on which it is installed.

The actuating assembly 220 also includes a storage means 236 for storing various items of information as described below.

One of the items stored in the storage means 236 is the location, in particular the GPS co-ordinates, of a planned destination of the motor vehicle. Another item of information stored in the storage means 236 is the distance from the planned destination within which the motor vehicle must be for actuation of the first actuating sub-assembly 46 to be permitted, the permitted distance being 100 metres in one embodiment of the invention. The electronic controller 228 is programmed with software which calculates whether the location of the vehicle as determined by the location determining means 234 is within the permitted distance of the planned destination and, if so, it causes a message to be sent via the communication means 230 to the remote installation 227 that the motor vehicle is within the permitted distance. If the motor vehicle is within the permitted distance, this is indicated on a user interface 238 at the remote installation 227. In this example, the user interface 238 includes a computer monitor whereby the position of the vehicle relative to the planned destination, i.e. whether or not the vehicle with within the permitted distance from the planned destination, and the status of the actuating assembly 220 (e.g. whether the first and second members 24, 26 are in their operative, i.e. connected, configuration and whether or not the first member 24 is in its home or locking position) is displayed. Instead, in an alternative embodiment of the invention (not shown), there could instead be a control panel with differently coloured lights for indicating the position of the vehicle relative to the planned destination and for indicating the status of the actuating assembly 220. The storage means 236 also stores the planned route of the motor vehicle to the destination.

The controller 228 includes a timer (not shown) and is programmed such that, after elapse of a preset time, e.g. elapse of 5 minutes measured by the timer, the solenoid 48 (shown in FIG. 13) causes displacement of the connecting component 30 (shown in FIGS. 14 to 16) from its connecting position to its non-connecting position. It is possible to achieve the uncoupling either: (i) by the controller 228 sending a signal for the solenoid to push (i.e. reverse direction) thereby disengaging element 30, 26; or (ii) by the controller 228 stopping the electromagnetic signal to the solenoid and by the biasing influence exerted by springs (not shown) displacing element 30 back into its natural inoperative configuration. The preset time is stored in the storage means 236. Accordingly, elapse of a preset time measured by the timer from receipt of a first key by the first actuating sub-assembly causes the first and second members to assume their inoperative configuration.

The controller 228 is programmed with software to provide a management facility whereby the planned destination and the planned route stored in the storage means 236 can be inputted or modified from the remote installation 227.

The controller 228 is also programmed with software which causes the actual location of the actuating assembly 220 obtained from the location determining means 234 to be continuously reported via the communication means 230 to the remote installation 227. The location determining means 234 and the programmed controller 228 thus provide the actuating assembly 220 with a real time location reporting means for real time reporting on the location of the motor vehicle (not shown).

The controller 228 is also programmed with software which compares the actual location of the motor vehicle with the planned route, the actual location being obtained from the location determining means 234. If there is a discrepancy between the actual location and the planned route, the programmed controller 238 causes a notification to be sent via the communicating means 230 to the remote location 232 that the actual route of the motor vehicle (not shown) does not conform with the planned route. The locating determining means 234 and the programmed controller 228 thus provide a route deviation notifying means for notifying the remote installation 227 when the actual route of the motor vehicle (not shown) does not conform with the planned route.

As described above with reference to the actuating assembly 100, the actuating assembly 220 includes limit switches 89*a*, 89*b*, the switch 89*a* for detecting displacement of member 30 and thus the engagement between first and second members 24 and 26. The actuating assembly 220 also includes sensing means (not shown) to detect whether the actuating assembly 220 has been struck by lightning and whether the locking mechanism of the second actuating sub-assembly 52 has been tampered with, e.g. if the second member 26 has been rotated without the first member 24 having been rotated indicating that an attempt had been made to unlock the locking mechanism when the first and second members 24, 26 were in their inoperative configuration. The switches 89*a*, 89*b* and the sensing means are connected to the controller 228.

The controller 228, by means of input from the switches 89*a*, 89*b*, can detect whether or not the actuating assembly 220 is in a locked condition, i.e. the condition in which the first and second members 24, 26 are in their inoperative configuration and the first member 24 is in its home or locking position. The controller 228 can then cause a message to be sent to the remote installation 227 indicating the condition of the actuating assembly 220 in this regard so that the display panel of the user interface 238 can display whether the actuating assembly 220 is in a locked or unlocked condition. If the sensing means (not shown) detects that the actuating assembly 220 has been struck by lightning or that the locking mechanism of the second actuating sub-assembly 52 has been tampered with, the controller 228 causes a message to be sent to the remote installation 227 which results in a warning message being displayed on the display panel of the user interface 238.

In use, prior to the departure of the motor vehicle to deliver cargo to a planned destination, the planned destination and the planned route are inputted via the user interface 238 at the remote installation 227 into the storage means 236 of the first actuating sub-assembly 46. The door to the cargo area of the vehicle is latched to its surrounds by means of the latching system 210. Once the door is latched, it cannot be unlatched without actuation of the actuating system 220.

Once the motor vehicle has arrived at its destination, the driver telephones the remote installation 227 to request actuation of the first actuating sub-assembly 46. If the motor vehicle is within the permitted distance from the planned destination, this is indicated on the display panel of the user interface 238 at the remote installation 227. If the display panel indicates that the vehicle is within the permitted distance from the planned destination, an operator at the remote installation 227 causes a first electronic key for the first actuating sub-assembly 47 to be sent via the communication facility 224 to the actuating assembly 220 for actuation of the first actuating sub-assembly 46, i.e. the solenoid 48 (shown in FIG. 13) causes displacement of the connecting component 30 (shown in FIGS. 14 to 16) from its connecting position to its non-connecting position, thereby to cause the first and second members 24, 26 to assume their operative configuration (shown in FIG. 15).

Once the first and second members 24, 26 are in their operative configuration, the driver can unlatch the latching system 210 by insertion of a mating mechanical key 226 into the passage of the locking mechanism of the second actuating sub-assembly 52 and rotationally displacing the key 226. As described above with reference to the actuating assembly 100, the rotational displacement of the key 226 causes the drive member 56 of the locking mechanism to rotate, which in turn causes the second member 26 and the first member 24 also to rotate, with the arm 112 rotating with the remainder of the first member 24 and causing the latching system 210 to unlatch.

As described above, the switch 89*b* can detect whether or not the first member 24 has been displaced from its home or locking position. If the actuating assembly 220 is not unlocked, i.e. if the first member 24 is not displaced away from its home or locking position, within five minutes of the receipt by the first actuating sub-assembly 46 as measured by the timer (not shown), the solenoid 48 causes displacement of the connecting component 30 from its connecting position to its non-connecting position. As previously mentioned, it is possible to achieve the uncoupling either: (i) by the controller 228 sending a signal for the solenoid to push (i.e. reverse direction) thereby disengaging element 30, 26; or (ii) by the controller 228 stopping the electromagnetic signal to the solenoid and by the biasing influence exerted by springs (not shown) displacing element 30 back into its natural inoperative configuration. In other words, elapse of a preset time measured by the timer from receipt of a first key by the first actuating sub-assembly causes the first and second members to assume their inoperative configuration. Unlocking of the actuating assembly 220 is then no longer possible until the first key is again sent from the remote installation 227 to the actuating assembly 220.

As mentioned above, whilst the motor vehicle is travelling, the real time location reporting means continuously reports on the location of the motor vehicle to the remote installation 227. If the motor vehicle deviates from the planned route, the route deviation notifying means notifies the remote installation 227 of the deviation.

By means of the invention as illustrated and described, an actuating assembly 10, 100 is provided which requires actuation by two keys (not shown) in order to displace its output drive member 44, 112. This can provide enhanced security when, in use, the actuating assembly 10, 100 is connected to a latching system. The actuating assembly 10, 100 can furthermore bear a significant amount of torque and load when compared to, for example, conventional actuating assemblies that are only electronically activated; however, the inclusion of the first actuating sub-assembly 46 in the actuating assembly 10, 100 described above means that tampering with the lock mechanism resulting in rotary displacement of the second member 26 should not in itself cause unlatching since, without the first and second members 24, 26 being connected to each other, displacement of the second member 26 will not cause the first member 24 to be displaced, and thus the output drive member 44, 112 will not be displaced.

Further, the security system 200 as illustrated and described can provide enhanced security which can be of particular use for cargo-carrying motor vehicles. In particular, before the locking mechanism can be unlocked with the key 226, the actuating assembly 220 must receive a first electronic key from the remote installation 227. Beneficially, the condition of the actuating assembly 220 and the location of the motor vehicle can be monitored from the remote installation 227. In particular, an operator at the remote installation 227 can check whether the motor vehicle is within the permitted distance of an intended destination before sending the first key. This provides an additional safety measure which can help to prevent loss of cargo due to robbery or theft along the route since the operator can ensure that the motor vehicle is at the planned destination before sending the first key.

It will be appreciated that, since the first key is a predetermined electromagnetic signal transmitted by a cellular telecommunication network (i.e. may be triggered by a cellular telephone), the person that provides the first key may roam. Furthermore, by automatically causing the first and second members to assume their inoperative condition after lapse of a predetermined time from receipt of the first key by the first actuating sub-assembly, the actuating assembly is rendered more secure against tampering and unauthorised operation.

The invention claimed is:

1. An actuating assembly to operate a displaceable component of a latching system, the actuating assembly including:

- a first member which is connected or connectable to the displaceable component of the latching system;
- a second member, the first and second members being disconnectably connectable to each other, with the first and second members being in an inoperative configuration when they are disconnected from each other such that the second member is displaceable independently of the first member, and the first and second members being in an operative configuration when they are connected to each other such that displacement of the second member causes the first member to be displaced;
- a first actuating sub-assembly including a first key receiver for receiving a non-mechanical first key in the form of a predetermined electromagnetic signal transmitted via a cellular telecommunications network;
- a second actuating sub-assembly which is operable by a second key, the second actuating sub-assembly being operably connected to the second member and being configured, when actuated by the second key, to cause the second member to be displaced, thereby to cause the first member to be displaced when the first and second members are in their operative configuration; and
- a timer for determining the time from receipt of the first key by the first actuating sub-assembly, wherein the first actuating sub-assembly is configured, upon: (i) receipt of the first key, to cause the first and second members to assume their operative configuration; and (ii) elapse of a preset time measured by the timer from receipt of the first key by the first actuating sub-assembly, to cause the first and second members to assume their inoperative configuration.

2. The actuating assembly according to claim 1, wherein, in use, the first member is directly connected or connectable to the displaceable component of the latching system, and an output drive member of the actuating assembly is provided by the first member.

3. The actuating assembly according to claim 1 wherein the first member is indirectly connected or connectable to the displaceable component of the latching system, and an output drive member of the actuating assembly is directly or indirectly connected to the first member, with displacement of the first member causing the output drive member to be displaced.

4. The actuating assembly according to claim 3, wherein the output drive member of the actuating assembly is or includes a projecting element or arm connected or connectable to the displaceable component of the latching system.

5. The actuating assembly according to claim 4 that is associated with: (i) a closure member or door; and (ii) a support structure on which the closure member or door is mounted, wherein the latching system is for latching the closure member or door to the support structure on which the closure member or door.

6. The actuating assembly according to claim 5, wherein the support structure is a static enclosure or a mobile enclosure.

7. The actuating assembly according to claim 6, wherein the enclosure is a safe, electrical box, electrical sub-station, truck, delivery van or shipping container.

8. The actuating assembly according to claim 7, wherein the first actuating sub-assembly includes a displaceable connecting component and a drive means.

9. The actuating assembly according to claim 8, wherein the drive means is a solenoid, an electric motor or a linear actuator, which includes the output drive member which is connected to the connecting component, the connecting component being displaceable between a connecting position in which it connects the first and second members to each other and a non-connecting position in which it does not connect the first and second members to each other.

10. The actuating assembly according to claim 9, wherein the first actuating sub-assembly includes a non-mechanical key identification means, with the drive means being linked to the non-mechanical key identification means such that the drive means is operative in response to a signal received from the non-mechanical key identification means to cause displacement of the connecting component from its non-connecting position to its connecting position.

11. The actuating assembly according to claim 10, further including: (i) an electronic controller; (ii) location determining means for determining the location or GPS co-ordinates of the actuating assembly; (iii) storage means for storing either a desired route or an area or location or GPS co-ordinates of a location, in which actuation of the first actuating sub-assembly is permitted; (iv) real time location reporting means for real time reporting via emission of a message via an electromagnetic signal to a remote location, on the location of the actuating assembly; and (v) route deviation notifying means for notifying when the location of the actuating assembly does not fall along the stored route.

12. The actuating assembly according to claim 11, wherein the electronic controller is configured to permit actuation of the first actuating sub-assembly only when the actuating assembly is at the location or within a specified distance from the location.

13. The actuating assembly according to claim 12, wherein the first actuating sub-assembly is operably connected to at least one of the first member and the second member.

14. The actuating assembly according to claim 13, wherein at least one of the first and second members includes the displaceable connecting component, the connecting component being connected, to the remainder of the first or second member, as the case may be, with the connecting component being receivable within a complementary receiving formation defined by the other member, thereby to connect the first and second members to each other.

15. The actuating assembly according to claim 14, wherein the first member includes the connecting component and the second member defines at least one complementary receiving formation for receiving the connecting component, with the first actuating sub-assembly being operably connected to the connecting component so as to cause displacement of the connecting component from its non-connecting position to its connecting position in response to the signal received from the non-mechanical key identification means.

16. The actuating assembly according to claim 15, wherein the first and second members are rotatably displaceable such that, when the first and second members are in their operative configuration, rotary displacement of the second member causes rotary displacement of the first member.

17. The actuating assembly according to claim 16, wherein: (i) the first member defines a circular aperture; and (ii) the second member is located within the aperture of the first member.

18. The actuating assembly according to claim 17, wherein the first member includes an outwardly projecting arm, with the arm being connected or connectable to the displaceable component of the latching system.

19. The actuating assembly according to claim 17, wherein the first member is connected to a linear toothed component, the linear, toothed component in effect providing, or being in the form of a linear or rack gear, with the linear toothed component being connected or connectable to the displaceable component of the latching system.

20. The actuating assembly according to claim 19, wherein the first member has a toothed portion which extends at least partially around a periphery of the first member, with the toothed portion of the first member engaging with the toothed portion of the linear or rack gear.

21. The actuating assembly according to claim 20, installed on a door frame or surrounds.

22. The actuating assembly according to claim 21, wherein the displaceable component of the latching system to which the first member is connected is a displaceable keeper plate which is connected to the door frame or surrounds in a manner such that a degree of displacement of the keeper plate relative to the door frame or surrounds is permitted, the keeper plate defining one or more apertures for receiving one or more latches mounted on the closure member or door.

23. The actuating assembly according to claim 22, wherein the or each latch defines an upwardly opening groove within which the displaceable keeper plate is captured by abutment of the keeper plate against a wall of the groove when the latch is in a latched position in which it is fast with the door frame or surrounds.

24. The actuating assembly according to claim 23, wherein displacement of the first member operates the latch to unlatch it by causing the displaceable keeper plate to be displaced upwardly so that it is no longer captured within the groove, thus permitting the or each latch to be withdrawn from the aperture of the displaceable keeper plate.

25. The actuating assembly according to claim 24, wherein the second actuating sub-assembly: (i) includes a mechanical lock mechanism which defines a passage or keyway for receiving a mating mechanical key; (ii) is configured to displace the second member when a mating key received in the passage or keyway is rotated; and (iii) includes a drive member which is operably connected to the second member, with the lock mechanism being configured to displace the drive member, with displacement of the drive member causing the second member to be displaced.

26. The actuating assembly according to claim 25, wherein the second member is a drive member of the lock mechanism, the lock mechanism being configured to displace the drive member when a mating key received in the passage or keyway is rotated.

* * * * *